United States Patent
Wittkopp

(10) Patent No.: US 8,083,632 B2
(45) Date of Patent: Dec. 27, 2011

(54) EIGHT-SPEED TRANSMISSION

(75) Inventor: Scott H. Wittkopp, Ypsilanti, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 898 days.

(21) Appl. No.: 12/051,341

(22) Filed: Mar. 19, 2008

(65) Prior Publication Data

US 2009/0239700 A1   Sep. 24, 2009

(51) Int. Cl.
*F16H 3/62* (2006.01)
*F16H 3/44* (2006.01)

(52) U.S. Cl. .................. 475/284; 475/275; 475/285

(58) Field of Classification Search .......... 475/275–293, 475/303, 311–313, 317–319, 323–325
See application file for complete search history.

(56) References Cited

U.S. PATENT DOCUMENTS

| | | | | |
|---|---|---|---|---|
| 4,660,439 A * | 4/1987 | Hiraiwa | ............ | 475/276 |
| 5,106,352 A | 4/1992 | Lepelletier | | |
| 5,133,697 A * | 7/1992 | Hattori | ............ | 475/276 |
| 5,342,258 A * | 8/1994 | Egyed | ............ | 475/281 |
| 6,669,596 B1 * | 12/2003 | Sefcik | ............ | 475/278 |
| 6,723,018 B2 | 4/2004 | Hayabuchi et al. | | |
| 7,008,346 B2 | 3/2006 | Stevenson | | |
| 7,247,119 B2 * | 7/2007 | Andres | ............ | 475/275 |
| 7,364,526 B2 * | 4/2008 | Cho | ............ | 475/279 |

FOREIGN PATENT DOCUMENTS

JP         2002266956 A *  9/2002

* cited by examiner

*Primary Examiner* — Tisha Lewis
(74) *Attorney, Agent, or Firm* — Quinn Law Group, PLLC

(57) ABSTRACT

An eight speed transmission is provided having three planetary gear sets controlled by seven or optionally eight torque-transmitting mechanisms to provide eight forward speed ratios and a reverse speed ratio. The first planetary gear set is representable by a three-node first lever. The second and third planetary gear sets are interconnected such that they are representable by a four-node second lever.

9 Claims, 4 Drawing Sheets

| GEAR STATE | GEAR RATIO | RATIO STEP | 50 | 52 | 54 | 55 | 56 | 57 | 58 | 59 |
|---|---|---|---|---|---|---|---|---|---|---|
| Rev | -3.240 | -0.64 | | | | G | X | | X | |
| N | | | | | | | | O | | O |
| 1st | 5.040 | | X | | | | | X | C | X |
| 2nd | 3.600 | 1.40 | X | | | | X | X | C | |
| 3rd | 2.443 | 1.47 | | | X | | X | X | | |
| 4th | 1.800 | 1.36 | | | X | | X | X | | |
| 5th | 1.286 | 1.40 | | | | X | X | X | | |
| 6th | 1.000 | 1.29 | | | X | X | | X | | |
| 7th | 0.802 | 1.25 | | | X | X | X | | | |
| 8th | 0.643 | 1.25 | | X | | X | X | | | |
| OVERALL RATIO = 7.84 | | | | | | | | | | |

| GEAR STATE | GEAR RATIO | RATIO STEP | 150 | 152 | 154 | 155 | 156 | 157 | 158 | 159 |
|---|---|---|---|---|---|---|---|---|---|---|
| Rev | -3.299 | -0.59 | | | G | | X | | X | |
| N | | | | | | | O | | O | |
| 1st | 5.636 | | X | | | | | X | C | X |
| 2nd | 4.338 | 1.30 | X | | | | X | X | C | |
| 3rd | 2.545 | 1.70 | | X | | | X | X | | |
| 4th | 1.649 | 1.54 | | | X | | X | X | | |
| 5th | 1.176 | 1.40 | | | | X | X | X | | |
| 6th | 1.000 | 1.18 | | | X | X | | X | | |
| 7th | 0.836 | 1.20 | | | X | X | X | | | |
| 8th | 0.667 | 1.25 | | X | | X | X | | | |
| OVERALL RATIO = 8.45 | | | | | | | | | | |

EIGHT-SPEED TRANSMISSION

TECHNICAL FIELD

The invention relates to a multi-speed transmission having three planetary gear sets and seven or eight torque-transmitting mechanisms controllable to establish eight forward speed ratios and one reverse speed ratio.

BACKGROUND OF THE INVENTION

Passenger vehicles include a powertrain that is comprised of an engine, a multi-speed transmission, and a differential or final drive. The multi-speed transmission increases the overall operating range of the vehicle by permitting the engine to operate through its torque range a number of times. The number of forward speed ratios that are available in the transmission determines the number of times the engine torque range is repeated. Early automatic transmissions had two speed ranges. This severely limited the overall speed range of the vehicle and therefore required a relatively large engine that could produce a wide speed and torque range. This resulted in the engine operating at a specific fuel consumption point during cruising, other than the most efficient point. Therefore, manually-shifted (countershaft transmissions) were the most popular.

With the advent of three- and four-speed automatic transmissions, the automatic shifting (planetary gear) transmission increased in popularity with the motoring public. These transmissions improved the operating performance and fuel economy of the vehicle. The increased number of speed ratios reduces the step size between ratios and therefore improves the shift quality of the transmission by making the ratio interchanges substantially imperceptible to the operator under normal vehicle acceleration.

It has been suggested that the number of forward speed ratios be increased to six or more. Six-speed transmissions offer several advantages over four- and five-speed transmissions, including improved vehicle acceleration and improved fuel economy. While many trucks employ power transmissions having six or more forward speed ratios, passenger cars are still manufactured with three- and four-speed automatic transmissions and relatively few five or six-speed devices due to the size and complexity of these transmissions. Seven-speed transmissions provide further improvements in acceleration and fuel economy over six-speed transmissions. However, like the six-speed transmissions discussed above, the development of seven- and eight-speed transmissions has been precluded because of complexity, size and cost.

SUMMARY OF THE INVENTION

The invention provides an eight-speed transmission having three planetary gear sets and at least seven but preferably eight torque-transmitting mechanisms engagable to provide eight forward speed ratios and a reverse speed ratio.

More specifically, the invention provides an eight speed transmission having an input member and an output member as well as a planetary gear arrangement including a first planetary gear set, a second planetary gear set and a third planetary gear set. The first planetary gear set is representable by a three-node first lever having a first, a second and a third node. The second and third planetary gear sets are interconnected with one another such that they are representable by a four-node second lever having a fourth, a fifth, a sixth and a seventh node. The input member is continuously connected for rotation with the first node, and the output member is continuously connected for rotation with the fifth node.

Seven torque-transmitting mechanisms are engaged in combinations of three to establish eight forward speed ratios and a reverse speed ratio between the input member and the output member. (If the optional eighth torque-transmitting mechanism is included, the torque-transmitting mechanisms are engaged in combinations of four for those speed ratios in which the eighth torque-transmitting mechanism is utilized.) The first torque-transmitting mechanism is selectively engageable to ground the seventh node to a stationary member such as the transmission housing. The second torque-transmitting mechanism is selectively engagable to connect the second node for common rotation with the seventh node. A third torque-transmitting mechanism is selectively engageable to connect the first node for common rotation with the sixth node. A fourth torque-transmitting mechanism is selectively engageable to ground the third node to the stationary member. A fifth torque-transmitting mechanism is selectively engageable to ground the second node for common rotation with the fourth node. A sixth torque-transmitting mechanism is selectively engageable to ground the sixth node to the stationary member. A seventh torque-transmitting mechanism is selectively engageable to connect the third node for common rotation with the seventh node. Optionally, an eighth torque-transmitting mechanism is provided that is a one-way clutch engagable to ground the sixth node to the stationary member. The eighth torque-transmitting mechanism is engaged only in those forward speed ratios in which the sixth torque-transmitting mechanism is engaged.

Preferably, the second planetary gear set has a first sun gear member, a first carrier member and a first set of elongated pinion gears. The third planetary gear set preferably has a second sun gear member, a second carrier member, a second set of pinion gears, and a ring gear member. The first carrier member is integral with the second carrier member such that both rotatably support the first and second sets of pinion gears. The first set of elongated pinion gears intermeshes with the first sun gear member, the ring gear member and the second set of pinion gears. The second set of pinion gears intermeshes with the second sun gear member. The fourth node represents the second sun gear member. The fifth node represents the ring gear member. The sixth node represents the integral first and second carrier members. The seventh node represents the first sun gear member.

In one embodiment, the first planetary gear set has a sun gear member, a carrier member rotatably supporting first and second sets of pinion gears, and a ring gear member. The first set of pinion gears intermeshes with the sun gear member and the second set of pinion gears. The second set of pinion gears intermeshes with the ring gear member. The first node represents the carrier member, the second node represents the ring gear member and the third node represents the sun gear member. Accordingly, in this embodiment, the first planetary gear set is a compound planetary gear set.

In another embodiment, the first planetary gear set has a sun gear member, a carrier member rotatably supporting a set of pinion gears, and a ring gear member. The pinion gears intermesh with both the sun gear member and the ring gear member. The first node represents the ring gear member, the second node represents the carrier member and the third node represents the sun gear member. Accordingly, in this embodiment, the first planetary gear set is the simple planetary gear set.

The planetary gear arrangement of the multi-speed transmission has first, second and third planetary gear sets which have first, second and third members. The input member is continuously connected for rotation with the first member of the first planetary gear set and the output member is continuously connected for rotation with the first member of the third planetary gear set. The second member of the second planetary gear set is integral with the second member of the third planetary gear set. The first torque-transmitting mechanism is selectively engageable to ground the first member of the second planetary gear set to the stationary member. The second torque-transmitting mechanism is selectively engageable to connect the second member of the first planetary gear set for common rotation with the first member of the second planetary gear set. The third torque-transmitting mechanism is selectively engageable to connect the first member of the first planetary gear set for common rotation with the second member of the third planetary gear set. The fourth torque-transmitting mechanism is selectively engageable to ground the third member of the first planetary gear set to the stationary member. The fifth torque-transmitting mechanism is selectively engageable to connect the second member of the first planetary gear set for common rotation with the third member of the third planetary gear set. The sixth torque-transmitting mechanism is selectively engageable to ground the second member of the second planetary gear set to the stationary member. The seventh torque-transmitting mechanism is selectively engageable to connect the third member of the first planetary gear set for common rotation with the first member of the second planetary gear set. Optionally, an eighth torque-transmitting mechanism is provided that is a one-way clutch engagable to ground the second member of the second planetary gear set to the stationary member. The eighth torque-transmitting mechanism is engaged only in those forward speed ratios in which the sixth torque-transmitting mechanism is engaged.

Preferably, the first member of the second planetary gear set is a first sun gear member. The second member of the second planetary gear set is a first carrier member. The third member of the second planetary gear set is a first set of elongated pinion gears. The first member of the third planetary gear set is a ring gear member. The second member of the third planetary gear set is a second carrier member. The third member of the third planetary gear set is a second sun gear member. The third planetary gear set has a second set of pinion gears that continuously intermesh with the first set of elongated pinion gears and with the second sun gear member. The first set of elongated pinion gears continuously intermeshes with the ring gear member.

In one embodiment the first member of the first planetary gear set is a ring gear member, the second member of the first planetary gear set is a carrier member and the third member of the first planetary gear set is a sun gear member.

In another embodiment the first member of the first planetary gear set is a carrier member, the second member of the first planetary gear set is a ring gear member, the third member of the first planetary gear set is the sun gear member. In this embodiment, the first planetary gear set is a compound planetary gear set having a first set of pinion gears intermeshing with the sun gear member and a second set of pinion gears intermeshing with both the first set of pinion gears and with the ring gear member.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figures 1, 3:
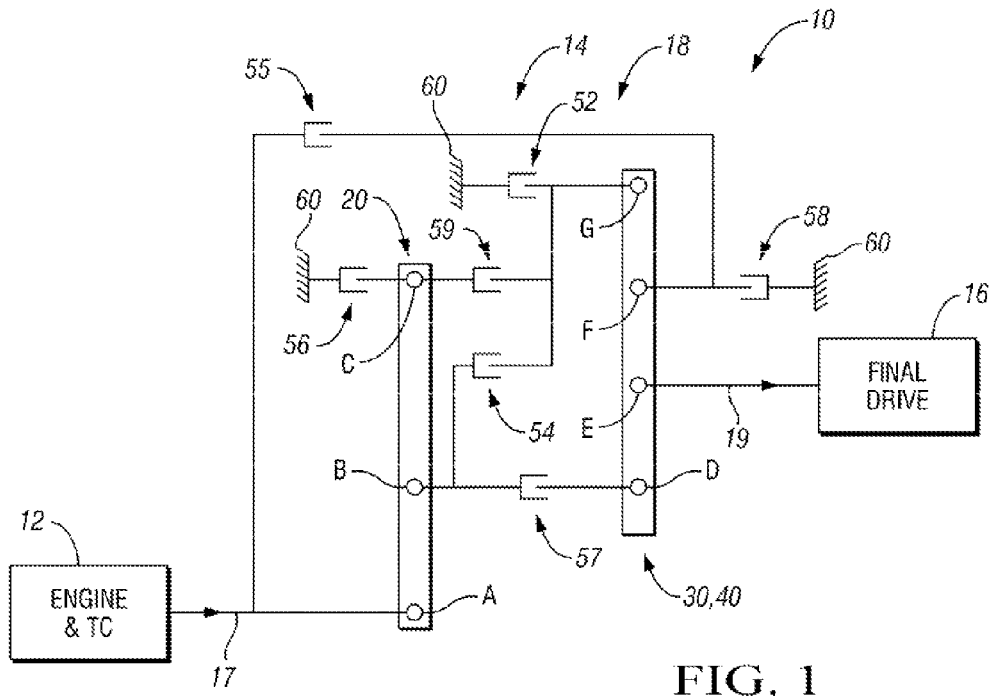
FIG. 1 is a schematic illustration of a first embodiment of a transmission within the scope of the invention in lever diagram form.
FIG. 3 is a truth table showing the engagement schedule for torque-transmitting mechanisms in the transmission of FIGS. 1 and 2.
Figure 2:
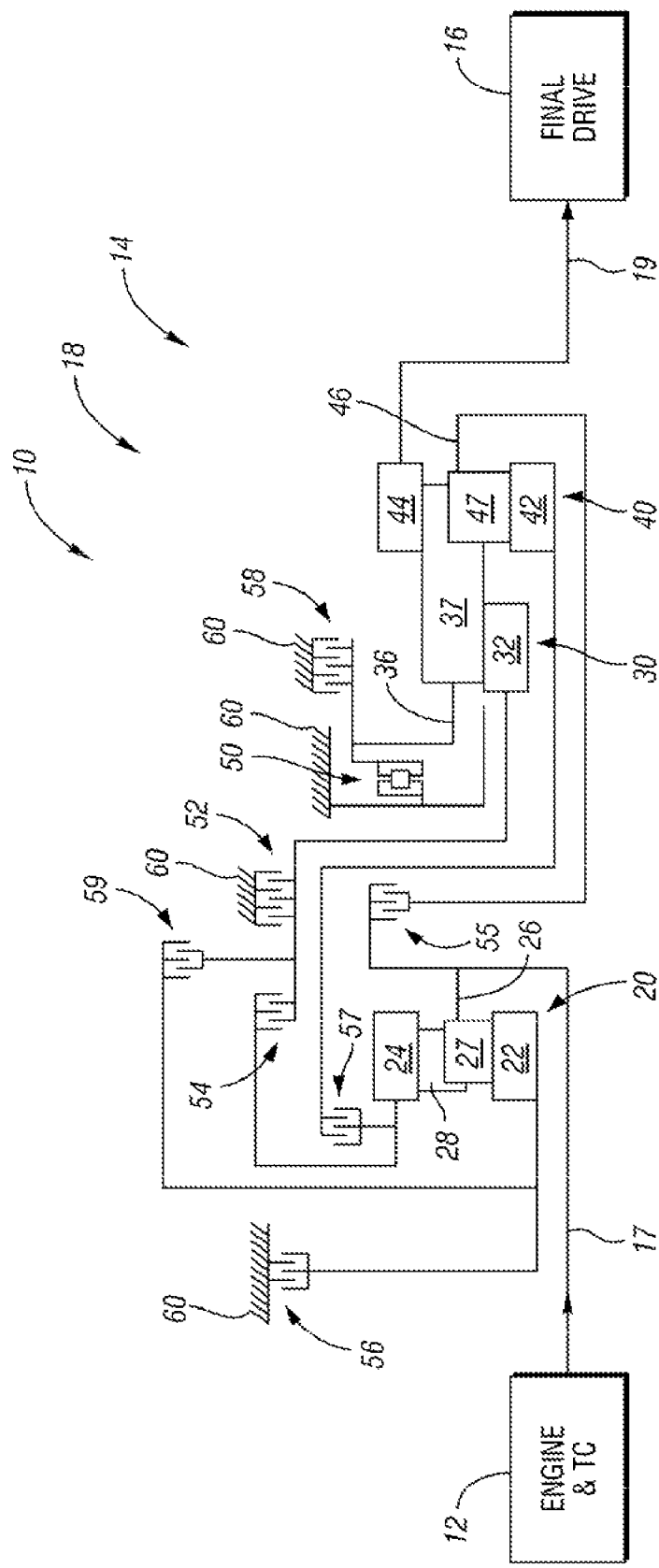
FIG. 2 is a schematic illustration in stick diagram form of the transmission of FIG. 1.

Referring to FIGS. 1 and 2, a lever diagram and a stick diagram are shown, respectively, for a transmission in accordance with the invention. Like reference numerals are used to refer to like components in all figures. In FIG. 1, a powertrain 10 includes a conventional engine and torque converter 12, a planetary transmission 14 and a conventional final drive mechanism 16. The planetary transmission 14 includes an input member 17 continuously connected with the engine and torque converter 12, a planetary gear arrangement 18 shown here in lever diagram form, and an output member 19 continuously connected with the final drive mechanism 16. The planetary gear arrangement 18 includes three planetary gear sets 20, 30, and 40, represented in lever form in FIG. 1, with first planetary gear set 20 represented by a first, three-node lever and the second and third planetary gear sets 30 and 40 represented by a second, four-node lever.

The first planetary gear set 20 shown in lever form has a first node A, a second node B, and a third node C. The first node A is continuously connected for common rotation with the engine and torque converter 12. The second and third planetary gear sets 30, 40, respectively, are represented by a four-node second lever having a fourth node D, and fifth node E, a sixth node F and a seventh node G. The fifth node E is continuously connected for common rotation with the output member 19.

The transmission 14 includes multiple torque-transmitting mechanisms including seven torque-transmitting mechanisms shown in FIG. 1. A clutch 52 (referred to in the claims as a first torque-transmitting mechanism) selectively connects seventh node G to a stationary transmission housing 60. A clutch 54 (referred to the in the claims as a second torque-transmitting mechanism) selectively connects second node B with seventh node G.

Clutch 55 (referred to in the claims as a third torque-transmitting mechanism) selectively connects the engine and torque converter 12 and the first node A with the sixth node F. A clutch 56 (referred to in the claims as a fourth torque-transmitting mechanism) selectively connects the third node C with the transmission housing 60. A clutch 57 (referred to in the claims as a fifth torque-transmitting mechanism) selectively connects the second node B with the fourth node D. A clutch 58 (referred to in the claims as a sixth torque-transmitting mechanism) selectively connects the sixth node F with the transmission housing 60. Optionally, a one-way clutch also acts on the sixth node F. The one-way clutch is not depicted in the lever diagram of FIG. 1, but is represented by one-way clutch 50 in FIGS. 2 and 3 and is referred to herein as an eighth torque-transmitting mechanism. A clutch 59

(referred to in the claims as a seventh torque-transmitting mechanism) selectively connects the third node C with the seventh node G.

Referring now to FIG. 2, the powertrain 10, engine and torque converter 12, planetary transmission 14 and conventional drive mechanism 16 are shown with the planetary gear arrangement 18 of the transmission 14 in stick diagram form. The planetary gear set 20 includes a sun gear member 22, a ring gear member 24 and a carrier member 26 rotatably supporting first and second sets of pinion gears 27 and 28, respectively. The first set of pinion gears 27 intermeshes with the sun gear member 22 and the second set of pinion gears 28. The second set of pinion gears 28 intermeshes with the ring gear member 24 and the first set of pinion gears 27. The carrier member 26 corresponds with the first node A of FIG. 1. The ring gear member 24 corresponds with the second node B of FIG. 1. The sun gear member 22 corresponds with the third node C of FIG. 1.

The second planetary gear set 30 includes a sun gear member 32 and a carrier member 36 rotatably supporting a first long set of elongated pinion gears 37. The planetary gear set 40 includes a sun gear member 42, a ring gear member 44, and a carrier member 46 rotatably supporting a second set of pinion gears 47. The carrier member 36 is integral with the carrier member 46. The first set of elongated pinion gears 37 intermeshes with the sun gear member 32, with the ring gear member 44, and with the second set of pinion gears 47. The pinion gears 47 intermesh with the sun gear member 42 and with the elongated pinion gears 37. The sun gear member 42 corresponds with the fourth node D of FIG. 1. The ring gear member 44 corresponds with the fifth node E of FIG. 1. The integral carrier members 36 and 46 correspond with the sixth node F of FIG. 1. The sun gear member 32 corresponds with the seventh node G of FIG. 1.

The torque-transmitting mechanisms 52, 54, 55, 56, 57, 58, and 59 described above with respect to FIG. 1 are shown in their respective positions in FIG. 2. An eighth torque-transmitting mechanism 50, which does not appear in the lever diagram of FIG. 1, is a one-way clutch connecting the integral carrier members 36 and 46 with the transmission housing 60 to allow only one-way rotation thereof.

As shown in the truth table of FIG. 3, the torque-transmitting mechanisms 50, 52, 54, 55, 56, 57, 58 and 59 are engaged in combinations of three or four to provide eight forward speed ratios and one reverse speed ratio. As indicated in the truth table, the torque-transmitting mechanisms 56 and 58 remain engaged through the neutral condition, thereby simplifying the forward/reverse interchange. Engaged torque-transmitting mechanisms are indicated by "X", "O", "G", or "C" in FIG. 3. "X" indicates that the torque-transmitting mechanism is engaged and carrying torque. "O" indicates that the torque-transmitting mechanism is engaged but not carrying torque. "G" indicates that the torque-transmitting mechanism is a garage-shift element that is engaged and carrying torque. A garage shift is one that is controlled at the PRNDL (park, reverse, neutral, drive, or low). The shifter in the vehicle controls a manual valve in the transmission that activates certain "garage-shift" clutches. These same clutches could be reused for other gear states. "C" indicates that the torque-transmitting mechanism is engaged for manual range coast braking. Manual range coast braking is for gears states when the vehicle is driving the engine and a one-way clutch would normally carry the load. (i.e., coasting down a large hill). Because the vehicle is pushing the engine, the one-way clutch cannot carry the load because the direction of torque is reversed and the one-way clutch is overrunning. Therefore, a redundant clutch next to the one-way clutch needs to be engaged to provide a torque reaction.

To establish the reverse speed ratio, the torque-transmitting mechanisms 54, 56 and 58 are engaged. The overall numerical value of the reverse speed ratio is −3.240, as indicated in the truth table.

The first forward speed ratio is established with the engagement of torque-transmitting mechanisms 50, 57, 58 and 59. The overall numerical value of the first forward speed ratio is 5.040, as indicated in the truth table. If one-way clutch 50 is not provided, the first forward speed ratio would be established with the engagement of torque-transmitting mechanisms 57, 58 and 59.

The second forward speed ratio is established with the engagement of torque-transmitting mechanisms 50, 56, 57 and 58. The overall numerical value of the second forward speed ratio is 3.600, as indicated in the truth table. If one-way clutch 50 is not provided, the second forward speed ratio would be established with the engagement of torque-transmitting mechanisms 56, 57 and 58.

The third forward speed ratio is established with the engagement of torque-transmitting mechanisms 52, 56 and 57. The overall numerical value of the third forward speed ratio is 2.443, as indicated in the truth table.

The fourth forward speed ratio is established with the engagement of torque-transmitting mechanisms 54, 56 and 57. The overall numerical value of the fourth forward speed ratio is 1.800, as indicated in the truth table.

The fifth forward speed ratio is established with the engagement of torque-transmitting mechanisms 55, 56 and 57. The overall numerical value of the fifth forward speed ratio is 1.286, as indicated in the truth table.

The sixth forward speed ratio is established with the engagement of torque-transmitting mechanisms 54, 55 and 57. The overall numerical value of the sixth forward speed ratio is 1.000, indicating a direct drive condition.

The seventh forward speed ratio is established with the engagement of torque-transmitting mechanisms 54, 55 and 56. The overall numerical value of the seventh forward speed ratio is 0.802, as indicated in the truth table.

The eighth forward speed ratio is established with the engagement of torque-transmitting mechanisms 52, 55 and 56. The overall numerical value of the eighth forward speed ratio is 0.643, as indicated in the truth table.

The speed ratios shown in the truth table of FIG. 3 are achieved by using the following ring gear member/sun gear member tooth ratios. The ring gear member 24/sun gear member 22 tooth ratio of planetary gear set 20 is 2.25; the ring gear member 44/sun gear member 32 tooth ratio of planetary gear set 30 is 1.80; and the ring gear member 44/sun gear member 42 tooth ratio of planetary gear set 40 is 2.00. The following pinion gear/sun gear member tooth ratios are used to achieve the speed ratio shown in FIG. 3: the pinion gear 27 to sun gear member 22 tooth ratio of the first planetary gear set 20 is 0.50; the pinion gear 28 to sun gear member 22 tooth ratio of the first planetary gear set 20 is 0.50; the pinion gear 37/sun gear member 32 tooth ratio of the planetary gear set 30 is 0.65; the tooth ratio of the pinion gears 37 to the sun gear member 42 of the third planetary gear set is 0.50; and the tooth ratio of the pinion gears 47 to the sun gear member 42 of the third planetary gear set is 0.50. The truth table of FIG. 3 also describes the ratio steps that are attained using the sample tooth ratios given. For example, the ratio step between the first and second forward speed ratios is 1.40, while the ratio step between the reverse and first forward speed ratio is −0.64. It can also be readily determined from the truth table FIG. 3 that all of the single step forward ratio interchanges are of the single transition variety. The arrows in FIG. 3 indicate the single transition required to shift from one speed ratio to a subsequent speed ratio (i.e., disengagement of one torque-transmitting mechanism and engagement of another torque-transmitting mechanism).

It should be appreciated that by changing one or more of the sample tooth ratios, different numerical speed ratios may be attained. For example, the following alternate tooth ratios may be employed in the transmission 14 of FIG. 2: a ring gear member 24/sun gear member 22 tooth ratio of planetary gear set 20 of 2.25; a ring gear member 44/sun gear member 32 tooth ratio of planetary gear set 30 of 2.00; a ring gear member 44/sun gear member 42 tooth ratio of planetary gear set 40 of 2.63; a pinion gear 27 to sun gear member 22 tooth ratio of the first planetary gear set 20 is 0.50; the pinion gear 28 to sun gear member 22 tooth ratio of the first planetary gear set 20 is 0.50; the pinion gear 37/sun gear member 32 tooth ratio of the planetary gear set 30 is 0.65; the tooth ratio of the pinion gears 37 to the sun gear member 42 of the third planetary gear set is 0.50; and the tooth ratio of the pinion gears 47 to the sun gear member 42 of the third planetary gear set is 0.50. These alternative tooth ratios would result in the following speed ratios under the same engagement schedule as shown in FIG. 3: a reverse speed of −3.600; a first forward speed ratio of 6.334; a second forward speed ratio of 4.734; a third forward speed ratio of 2.778; a fourth forward seed ratio of 1.800; a fifth forward speed ratio of 1.203; a sixth forward speed ratio of 1.000; a seventh forward speed ratio of 0.818; an eighth forward speed ratio of 1.23; and an overall speed ratio of 9.50.

Figures 4, 6:
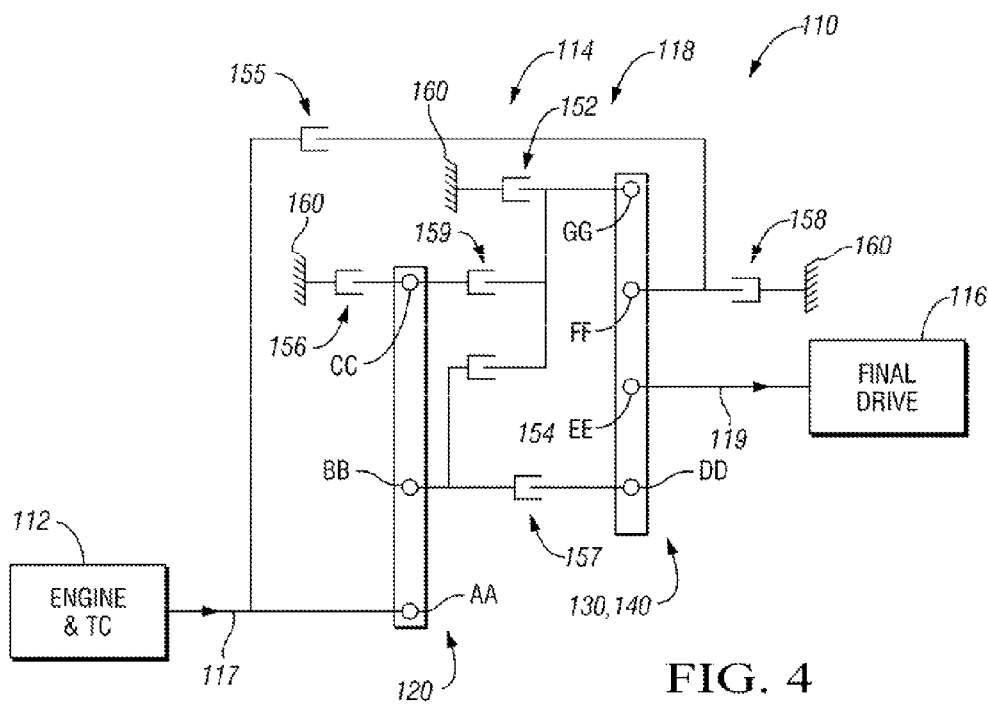
FIG. 4 is a schematic illustration of a second embodiment of a transmission within the scope of the invention in lever diagram form.
FIG. 6 is a truth table showing the engagement schedule for torque-transmitting mechanisms in the transmission of FIGS. 4 and 5.
Figure 5:
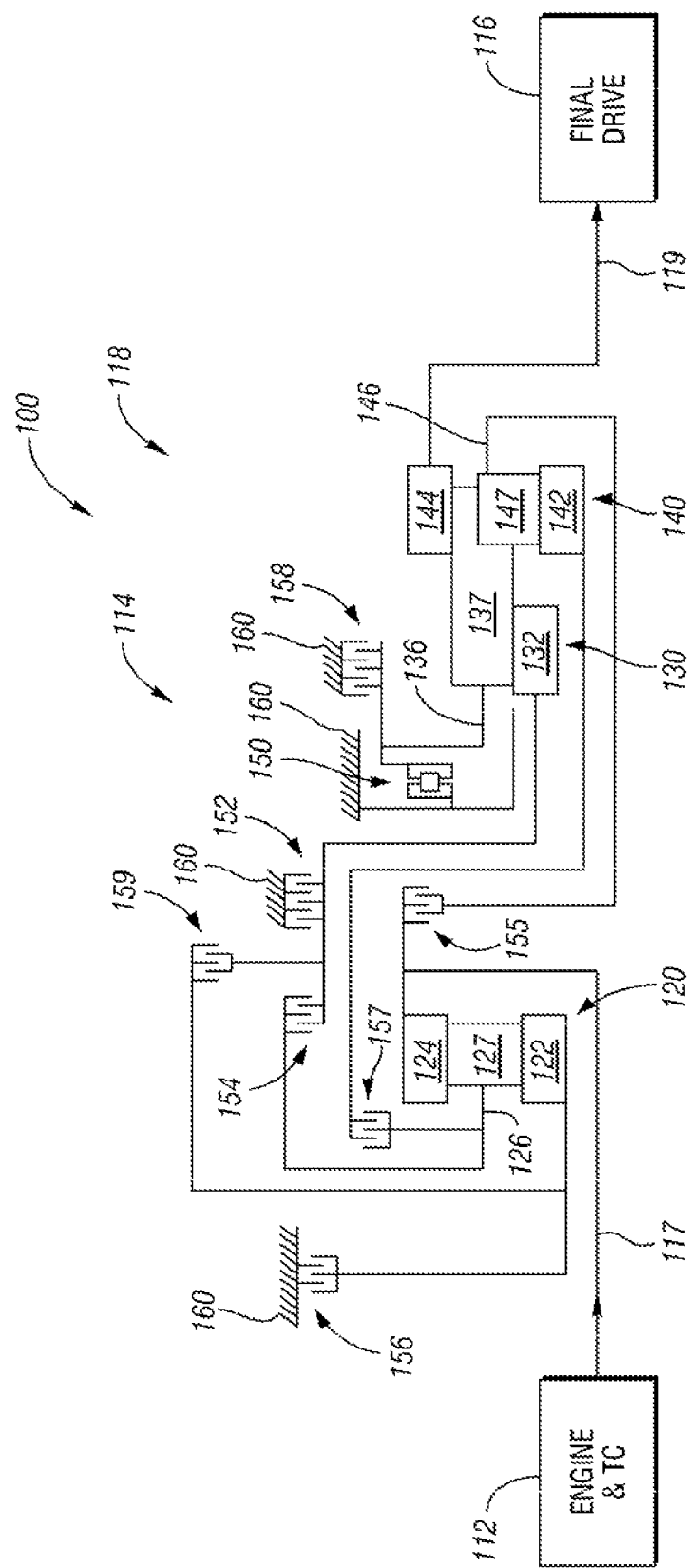
FIG. 5 is a schematic illustration in stick diagram form of the transmission of FIG. 4.

Referring to FIGS. 4 and 5, a lever diagram and a stick diagram are shown, respectively, for another embodiment of a transmission in accordance with the invention. In FIG. 4, a powertrain 110 includes a conventional engine and torque converter 112, a planetary transmission 114 and a conventional final drive mechanism 116. The planetary transmission 114 includes an input member 117 continuously connected with the engine and torque converter 112. A planetary gear arrangement 118 shown here in lever diagram form, and an output member 119 continuously connected with the final drive mechanism 116. The planetary gear arrangement 118 includes three planetary gear sets 120, 130 and 140, represented in lever form in FIG. 4, with the first planetary gear set 120 represented by a first, three-node lever and the second and third planetary gear sets 130 and 140 represented by a second, four-node lever.

The first planetary gear set 120 shown in lever form has a first node AA, a second node BB, and a third node CC. First node AA is continuously connected for common rotation with the engine and torque converter 112. The second and third planetary gear sets 130 and 140, respectively, are represented by a four-node lever having a fourth node DD, a fifth node EE, a sixth node FF and a seventh node GG. The fifth node EE is continuously connected for common rotation with the output member 119.

The transmission 114 includes multiple torque-transmitting mechanisms including the seven torque-transmitting mechanisms shown in FIG. 5. A clutch 152 (referred to in the claims as the first torque-transmitting mechanism) selectively connects seventh node GG to the stationary transmission housing 160. A clutch 154 (referred to in the claims as a second torque-transmitting mechanism) selectively connects second node BB with seventh node GG. Clutch 155 (referred to in the claims as a third torque-transmitting mechanism) selectively connects the engine and torque converter 112 and the first node AA with the sixth node FF. A clutch 156 (referred to in the claims as a fourth torque-transmitting mechanism) selectively connects the third node CC with the transmission housing 160. A clutch 157 (referred to in the claims as a fifth torque-transmitting mechanism) selectively connects second node BB with the fourth node DD. A clutch 158 (referred to in the claims as a sixth torque-transmitting mechanism) selectively connects the sixth node FF with the transmission housing 160. Optionally, a one-way clutch also acts on the sixth node FF. The one-way clutch is not depicted in the lever diagram of FIG. 4, but is represented by one-way clutch 150 in FIGS. 5 and 6 and is referred to herein as an eighth torque-transmitting mechanism. The clutch 159 (referred to in the claims as a seventh torque-transmitting mechanism) selectively connects the third node CC with the seventh node GG.

Referring now to FIG. 5, the powertrain 110, engine and torque converter 112, planetary transmission 114, input member 17, output member 119 and conventional drive mechanism 116 are shown with the planetary gear arrangement 118 of the transmission 114 in stick diagram form. The planetary gear set 120 includes a sun gear member 122, a ring gear member 124 and a carrier member 126 rotatably supporting a first set of pinion gears 127. The pinion gears 127 intermesh with the sun gear member 122 and the ring gear member 124. The ring gear member 124 corresponds with the first node AA of FIG. 4. The carrier member 126 corresponds with the second node BB of FIG. 4. The sun gear member 122 corresponds with the third node CC of FIG. 4.

The second planetary gear set 130 includes a sun gear member 132 and a carrier member 136 rotatably supporting a first set of elongated pinion gears 137. The planetary gear set 140 includes a sun gear member 142, a ring gear member 144, and a carrier member 146 rotatably supporting a second set of pinion gears 147. The carrier member 136 is integral with the carrier member 146. The first set of elongated pinion gears 137 intermeshes with the sun gear member 132, with the ring gear member 144, and the with the second set of pinion gears 137. The pinion gears 147 intermesh with the sun gear member 142 and with the elongated pinion gears 137. The sun gear member 142 corresponds with the fourth node DD of FIG. 4. The ring gear member 144 corresponds with the fifth node EE of FIG. 4. The integral carrier member 136 and 146 corresponds with the sixth node FF of FIG. 4. The sun gear member 132 corresponds with the seventh node GG of FIG. 4.

The torque-transmitting mechanisms 152, 154, 155, 156, 158 and 159 described above with the respect to FIG. 4 are shown in their respective positions in FIG. 5. The eighth torque-transmitting mechanism 150 that does not appear in the lever diagram of FIG. 4 is a one-way clutch connecting the integral carrier members 136 and 146 with the transmission housing 160 to allow only one-way rotation thereof.

As shown in the truth table of FIG. 6, the torque-transmitting mechanisms 150, 152, 154, 155, 156, 157, 158 and 159 are engaged in combinations of three or four to provide eight forward speed ratios and one reverse speed ratio. As indicated in the truth table, torque-transmitting mechanisms 156 and 158 remain engaged through the neutral condition, thereby simplifying the forward/reverse interchange. Engaged torque-transmitting mechanisms are indicated by "X", "O", "G" or "C" in FIG. 6. The "X", "O", "G" and "C" indicate the same engagement conditions as described with respect to FIG. 3.

To establish the reverse speed ratio, the torque-transmitting mechanisms 154, 156 and 158 are engaged. The overall numerical value of the reverse speed ratio is −3.299, as indicated in the truth table.

The first forward speed ratio is established with the engagement of torque-transmitting mechanism 150, 157, 158 and 159. The overall numerical value of the first forward speed ratio is 5.636, as indicated in the truth table. If one-way clutch 150 is not provided, the first forward speed ratio would be established with the engagement of clutches 157, 158 and 159.

The second forward speed ratio is established with the engagement of torque-transmitting mechanisms 150, 156, 157 and 158. The overall numerical value of the second forward speed ratio is 4.338, as indicated in the truth table. If one-way clutch 150 is not provided, the second forward speed ratio would be established with the engagement of torque-transmitting mechanisms 156, 157 and 158.

The third forward speed ratio is established with the engagement of torque-transmitting mechanisms 152, 156 and 157. The overall numerical value of the third forward speed ratio is 2.545, as indicated in the truth table.

The fourth forward speed ratio is established with the engagement of torque-transmitting mechanisms 154, 156 and 157. The overall numerical value of the fourth forward speed ratio is 1.649, as indicated in the truth table.

The fifth forward speed ratio is established with the engagement of torque-transmitting mechanisms 155, 156 and 157. The overall numerical value of the fifth forward speed ratio is 1.176, as indicated in the truth table.

The sixth forward speed ratio is established with the engagement of torque-transmitting mechanisms 154, 155 and 157. The overall numerical value of the sixth forward speed ratio is 1.000, indicating a direct drive condition.

The seventh forward speed ratio is established with the engagement of torque-transmitting mechanisms 154, 155 and 156. The overall numerical value of the seventh forward speed ratio is 0.836, as indicated in the truth table.

The eighth forward speed ratio is established with the engagement of torque-transmitting mechanisms 152, 155 and 156. The overall numerical value of the eighth forward speed ratio is 0.667, as indicated in the truth table.

The speed ratios shown on the truth table of FIG. 6 are achieved by using the following ring gear member/sun gear member tooth ratios. The ring gear member 124/sun gear member 122 tooth ratio of the planetary gear set 120 is 1.54; the ring gear member 144/sun gear member 132 tooth ratio of the planetary gear set 130 is 2.00; and the ring gear member 144/sun gear member 142 tooth ratio of the planetary gear set 140 is 2.63. The following pinion gear/sun gear member tooth ratios are used to achieve the speed ratios shown on FIG. 6: the pinion gear 127/sun gear member 122 tooth ratio of the planetary gear set 120 is 0.27; the pinion gear 137/sun gear member 132 tooth ratio of the planetary gear set 130 is 0.52; the tooth ratio of pinion gear member 137/sun gear member 142 is 0.69; and the tooth ratio of pinion gear member 147/sun gear member 142 is 0.74. The truth table of FIG. 6 also describes the ratio steps that are attained using the sample tooth ratios given. For example the ratio step between the first and second forward speed ratios is 1.30 while the ratio steps between the reverse and first forward speed ratio is −0.59. It can also be readily determined from the truth table in FIG. 6 that all of the single step forward ratio interchanges are of the single transition variety. The arrows in FIG. 6 indicate the single transition required to shift from one speed ratio to a subsequent speed ratio (i.e., disengagement of one torque-transmitting mechanism and engagement of another torque-transmitting mechanism).

While the best modes for carrying out the invention have been described in detail, those familiar with the art to which this invention relates will recognize various alternative designs and embodiments for practicing the invention within the scope of the appended claims.

The invention claimed is:
1. A multi-speed transmission comprising:
an input member;
an output member;
a first planetary gear set having a first member, a second member, and a third member;
a second and a third planetary gear set; wherein said second planetary gear set has a first sun gear member, a first carrier member and a first set of elongated pinion gears; wherein said third planetary gear set has a second sun gear member, a second carrier member, a second set of pinion gears and a ring gear member; wherein said first carrier member is integral with said second carrier member such that both of said carrier members rotatably support said first set of elongated pinion gears and said second set of pinion gears; wherein said first set of elongated pinion gears intermeshes with said first sun gear member, with said ring gear member and with said second set of pinion gears; wherein said second set of pinion gears intermeshes with said second sun gear member; wherein said input member is continuously connected for rotation with said first member and said output member is continuously connected for rotation with said ring gear member of said third planetary gear set;
a first torque-transmitting mechanism selectively engagable to ground said first sun gear member of said second planetary gear set to a stationary member;
a second torque-transmitting mechanism selectively engagable to connect said second member for common rotation with said first sun gear member of said second planetary gear set;
a third torque-transmitting mechanism selectively engagable to connect said first member for common rotation with said first and second carrier members;
a fourth torque-transmitting mechanism selectively engagable to connect said third member with said stationary member;
a fifth torque-transmitting mechanism selectively engagable to connect said second member for common rotation with said second sun gear member of said third planetary gear set;
a sixth torque-transmitting mechanism selectively engagable to connect said first and second carrier members with said stationary member;
a seventh torque-transmitting mechanism selectively engagable to connect said third member for common rotation with said first sun gear member of said second planetary gear set; and
wherein said torque-transmitting mechanisms are engaged in combinations of at least three to establish eight forward speed ratios and a reverse speed ratio between said input member and said output member.
2. The multi-speed transmission of claim 1, wherein said first member of said first planetary gear set is a carrier member, said second member of said first planetary gear set is a ring gear member and said third member of said first planetary gear set is a sun gear member;
wherein said first planetary gear set has first and second sets of pinion gears rotatably supported by said carrier member of said first planetary gear set; wherein said first set of pinion gears intermeshes with said sun gear member of said first planetary gear set and with said second set of pinion gears; and wherein said second set of pinion gears intermeshes with said ring gear member of said first planetary gear set.

3. The multi-speed transmission of claim 1, wherein said first member of said first planetary gear set is a ring gear member, said second member of said first planetary gear set is a carrier member and said third member of said first planetary gear set is a sun gear member; and
 wherein said carrier member rotatably supports a set of pinion gears that mesh with both said sun gear member and said ring gear member.

4. The multi-speed transmission of claim 1, further comprising:
 an eighth torque-transmitting mechanism that is a one-way clutch engagable to ground said first and second carrier members to said stationary member; and wherein said eighth torque-transmitting mechanism is engaged only in different ones of said eight forward speed ratios in which said sixth torque-transmitting mechanism is engaged.

5. A multi-speed transmission comprising:
 an input member;
 an output member;
 a planetary gear arrangement having first, second and third planetary gear sets, each of said gear sets having first, second and third members;
 wherein said input member is continuously connected for rotation with said first member of said first planetary gear set and said output member is continuously connected for rotation with said first member of said third planetary gear set; wherein said second member of said second planetary gear set is integral with said second member of said third planetary gear set;
 a first torque-transmitting mechanism selectively engagable to ground said first member of said second planetary gear set to a stationary member;
 a second torque-transmitting mechanism selectively engagable to connect said second member of said first planetary gear set for common rotation with said first member of said second planetary gear set;
 a third torque-transmitting mechanism selectively engagable to connect said first member of said first planetary gear set for common rotation with said second member of said third planetary gear set;
 a fourth torque-transmitting mechanism selectively engagable to ground said third member of said first planetary gear set to said stationary member;
 a fifth torque-transmitting mechanism selectively engagable to connect said second member of said first planetary gear set for common rotation with said third member of said third planetary gear set;
 a sixth torque-transmitting mechanism selectively engagable to ground said second member of said second planetary gear set to said stationary member;
 a seventh torque-transmitting mechanism selectively engagable to connect said third member of said first planetary gear set for common rotation with said first member of said second planetary gear set; and
 wherein said torque-transmitting mechanisms are engaged in combinations of at least three to establish eight forward speed ratios and a reverse speed ratio between said input member and said output member.

6. The transmission of claim 5, further comprising:
 an eighth torque-transmitting mechanism that is a one-way clutch engagable to ground said second member of said second planetary gear set to said stationary member; and wherein said eighth torque-transmitting mechanism is engaged only in different ones of said eight forward speed ratios in which said sixth torque-transmitting mechanism is engaged.

7. The transmission of claim 5, wherein said first member of said first planetary gear set is a ring gear member; wherein said second member of said first planetary gear set is a carrier member; and wherein said third member of said first planetary gear set is a sun gear member.

8. The transmission of claim 5, wherein said first member of said first planetary gear set is a carrier member; wherein said second member of said first planetary gear set is a ring gear member; wherein said third member of said first planetary gear set is a sun gear member; and wherein said first planetary gear set is a compound planetary gear set having a first set of pinion gears intermeshing with said sun gear member and a second set of pinion gears intermeshing with both said first set of pinion gears and said ring gear member.

9. The transmission of claim 5, wherein said first member of said second planetary gear set is a first sun gear member; wherein said second member of said second planetary gear set is a first carrier member; wherein said third member of said second planetary gear set is a first set of elongated pinion gears; wherein said first member of said third planetary gear set is a ring gear member; wherein said second member of said third planetary gear set is a second carrier member; wherein said third member of said third planetary gear set is a second sun gear member; wherein said third planetary gear set has a second set of pinion gears continuously intermeshing with said first set of elongated pinion gears and with said second sun gear member; and wherein said first set of elongated pinion gears continuously intermeshes with said ring gear member.

* * * * *